(12) United States Patent
Hoffman et al.

(10) Patent No.: US 6,682,413 B1
(45) Date of Patent: Jan. 27, 2004

(54) FLUID CONTROL VALVE

(75) Inventors: Herbert L. Hoffman, Seattle, WA (US); Pat Parkin, BonneyLake, WA (US); Frederick R. Helms, Puyallup, WA (US); Wen-Hwang Lin, Moorpark, CA (US); Roy Hai-Tien Loh, Thousand Oaks, CA (US); Yeu-Chuan Hsia, Northridge, CA (US); Naval Agarwal, Sammamish, WA (US); F. Wayne Hollatz, Elma, WA (US); Robert J. Devitis, Baytown, TX (US); Richard A. Black, Lynnwood, WA (US); Wendell R. Miller, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/301,378

(22) Filed: Nov. 21, 2002

(51) Int. Cl.[7] .................................................. B60H 3/00
(52) U.S. Cl. ........................ 454/156; 454/284; 454/335; 454/358; 454/363
(58) Field of Search .......................... 454/76, 156, 284, 454/328, 330, 333, 337, 358, 363

(56) References Cited

U.S. PATENT DOCUMENTS

| | | | |
|---|---|---|---|
| 4,194,722 A | 3/1980 | Okerblom | |
| 4,243,203 A | 1/1981 | Mack | |
| 4,766,807 A | * 8/1988 | Davis | ........................ 454/333 |
| 5,102,097 A | 4/1992 | Davis et al. | |
| 5,511,584 A | 4/1996 | Leinen | |
| 5,758,689 A | 6/1998 | Leinen | |
| 5,881,995 A | 3/1999 | Tse et al. | |

* cited by examiner

*Primary Examiner*—Jiping Lu
(74) *Attorney, Agent, or Firm*—Harness Dickey & Pierce P.L.C.

(57) ABSTRACT

A valve for controlling a flow of a fluid between a first environment to a second environment is provided. The valve includes a frame that fits within an aperture in a divider separating the first environment from the second environment. Additionally, the valve includes at least one gate mounted and movable within the frame to control a flow of the fluid between the first environment and the second environment through the aperture. The gate includes a surface, wherein at least one portion of the surface includes a rough texture. The rough texture reduces coherent vortex shedding of the fluid as the fluid passes over the gate surface.

26 Claims, 5 Drawing Sheets

FLUID CONTROL VALVE

FIELD OF INVENTION

The invention relates generally to valves for controlling the flow of a fluid between a first environment and a second environment, and more particularly to reducing noise generated by the fluid flowing through such a valve.

BACKGROUND OF THE INVENTION

Gated valves are often used to control the flow of a fluid from one environment to another. For example, gated valves may control the flow of a fluid, such as air, from one portion of an enclosure, such as a pipe, to another portion of the enclosure, or from an inside or outside area of an enclosure, such as a mobile platform, to the respective outside or inside area of the enclosure. Typically, as the rate of flow through the valve increases, the amount of audible noise, produced by the fluid passing through the valve and over the valve gate(s), increases. For example, if a valve is controlling the flow of air, the faster the air flows through the valve and over the valve gate(s), the greater the likelihood there is of audible tones (i.e. noise) being generated by coherent vortex shedding as the air separates from the gate(s) surface. Vortex shedding occurs when a fluid passing over a surface separates from the surface due to some incongruity, e.g. a bump or protrusion on the surface. As the fluid separates from the surface the fluid begins to tumble. If this tumbling occurs at a constant rate, i.e. frequency, coherent vortex shedding occurs and tones are produced.

A more specific example would be the use of gated valves in mobile platforms. Mobile platforms, such as aircraft, buses, ships or trains, often control such things as passenger compartment air pressure, air condition/quality, and air circulation by controlling the flow of air from inside the passenger compartment to the environment outside the passenger compartment utilizing a gated valve. At various flow rates, the air passing through the valve and over the gate(s) will generate tones caused by the air passing through the valve opening and over or across the surfaces of the gate.

The noise generated by a fluid as the fluid passes through a gated valve can be nuisance to people within hearing distance and become very irritating over extended periods of time.

BRIEF SUMMARY OF THE INVENTION

In one preferred embodiment, a valve for controlling a flow of a fluid between a first environment to a second environment is provided. The valve includes a frame that fits within an aperture in a divider separating the first environment from the second environment. Additionally, the valve includes at least one gate mounted and movable within the frame to control a flow of the fluid between the first environment and the second environment through the aperture. The gate includes a surface, wherein at least one portion of the surface includes a rough texture. The rough texture reduces coherent vortex shedding of the fluid as the fluid passes over the gate surface.

In another preferred embodiment, a method for controlling the flow of a fluid between a first environment to a second environment is provided. The method includes providing a valve installed in a divider separating the first environment and the second environment. The valve includes at least one gate that controls the flow of the fluid between the first and second environments. The gate includes a surface, wherein at least one portion of the surface includes a rough texture for reducing coherent vortex shedding of the fluid.

In yet another preferred embodiment, a mobile platform is provided wherein the mobile platform includes a body having an outer shell with an aperture therethrough. A valve is adapted to fit within the aperture for controlling the flow of air between an environment inside the mobile platform and an environment outside of the mobile platform. The valve includes at least one gate having a surface with at least one portion including a rough texture. The rough texture reduces coherent vortex shedding of the air as the air passes through the valve.

BRIEF DESCRIPTION OF THE DRAWINGS

The present invention will become more fully understood from the detailed description and accompanying drawings, wherein.

DETAILED DESCRIPTION OF THE INVENTION

The present invention is applicable to any circumstance in which a valve is utilized to control the flow of a fluid between a first environment, or location, and a second environment, or location. For example, the invention is applicable to a mobile platform utilizing a valve to control the flow of air between a mobile platform interior environment and a mobile platform exterior environment. Although exemplary embodiments of the invention herein will reference a mobile platform, one skilled in the art will readily understand the scope of the invention should not be so limited.

Figure 1:
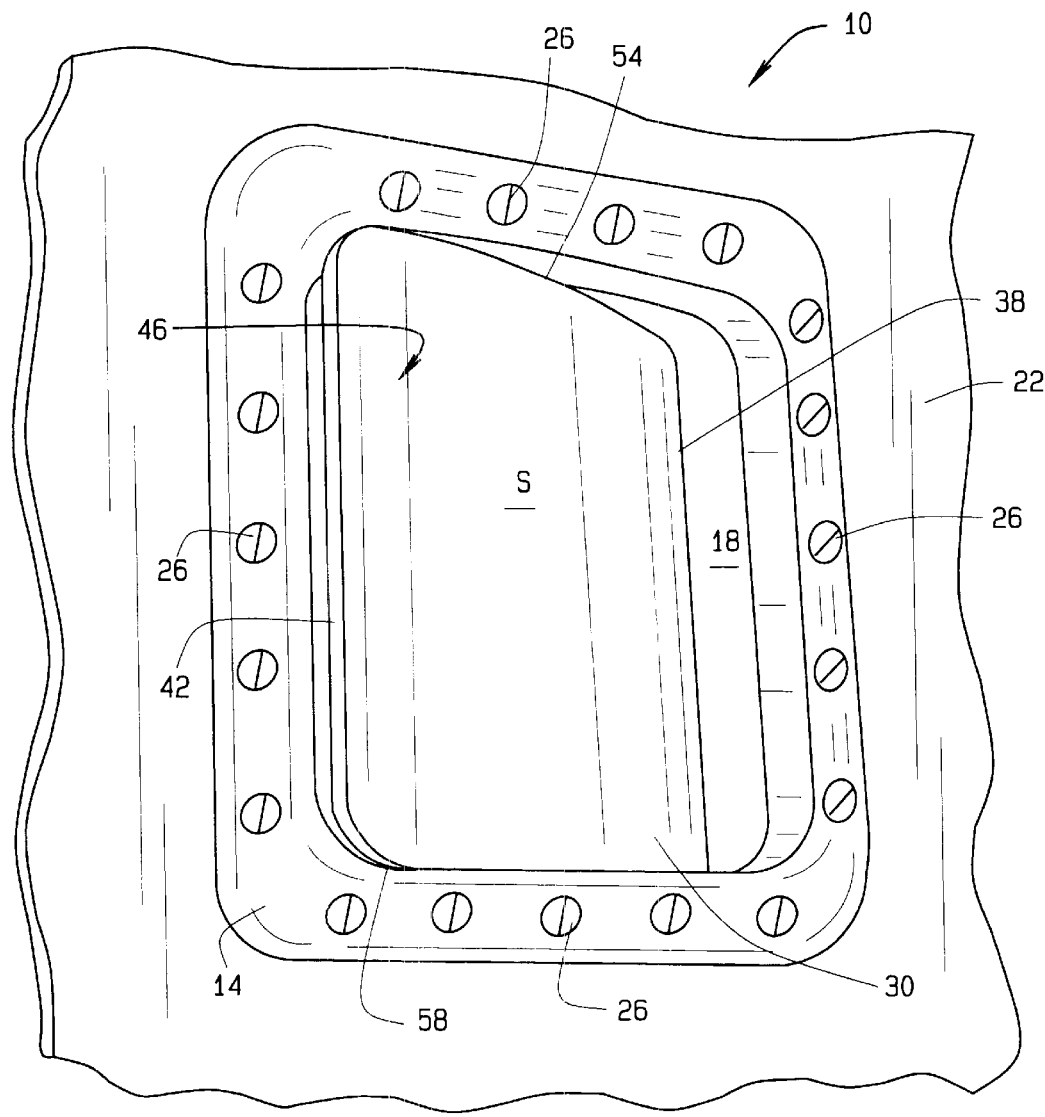
FIG. 1 is a schematic of a front view of a valve for controlling the flow of a fluid between a first environment and a second environment, in accordance with one preferred embodiment of the present invention.
Figure 2:
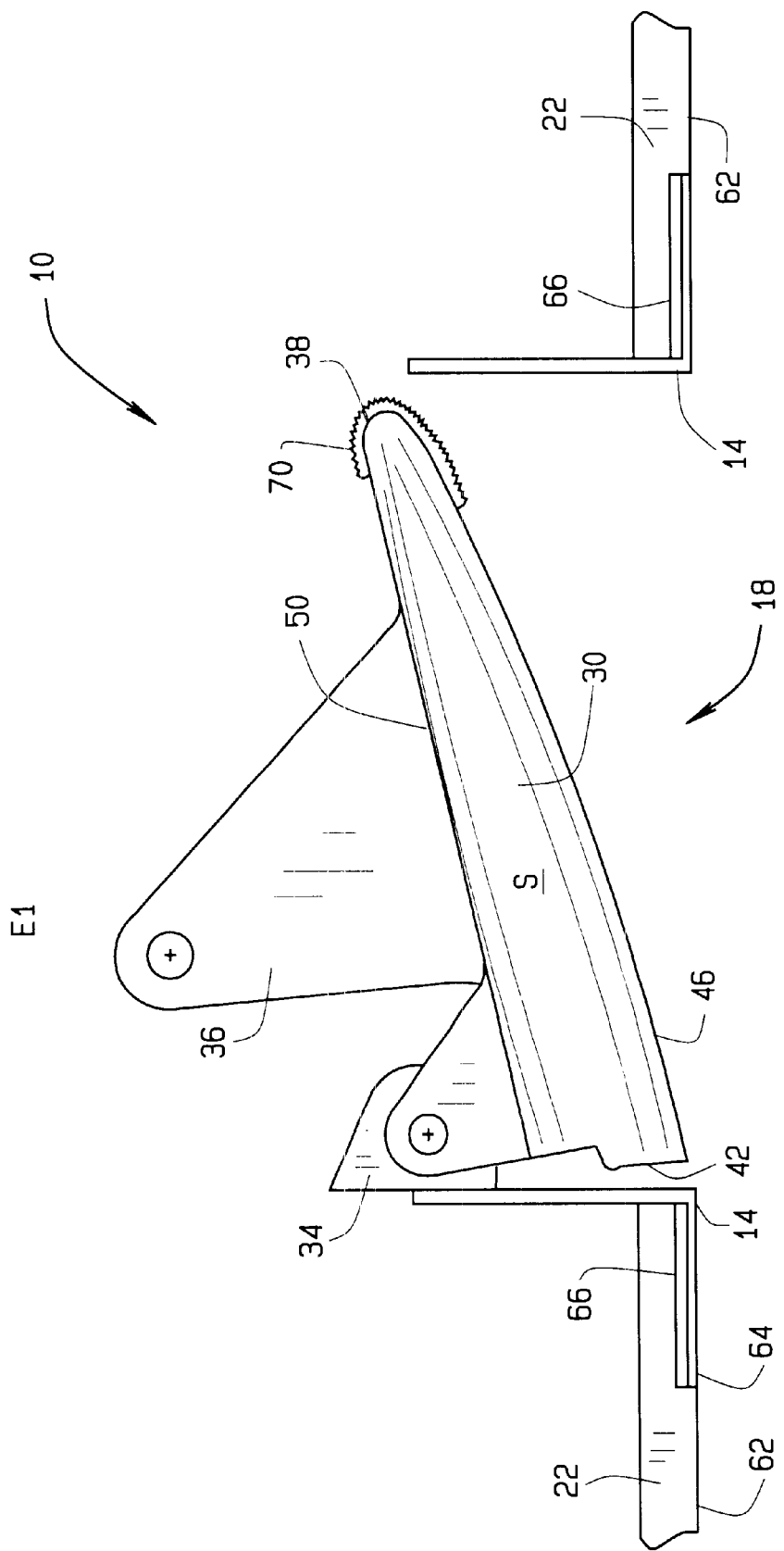
FIG. 2 is a schematic of a top view of the valve shown in FIG. 1.

FIGS. 1 and 2 are, respectively, a schematic of a front view and a top view of a valve 10 for controlling the flow of a fluid, for example air, between a first environment E1 and a second environment E2, in accordance with one preferred embodiment of the present invention. Valve 10 includes a frame 14 adapted to fit within a perimeter of an aperture 18 in a divider 22. Frame 14 is coupled to divider 22 using a fastening means 26 such as welding or a plurality of rivets, nuts and bolts, screws, and tack welds. At least one gate 30 is hingedly coupled to frame 14, via at least one hinge 34, such that gate 30 is movable between an open position and a closed position within frame 14. In the closed position gate 30 will have approximately a zero degree (0°) angle with divider 22. In the open position gate 30 can have any angle greater than zero degrees (0°) and less than one hundred and eighty (180°) based on a desirable fluid mass flow through aperture 18. For example, the larger the desired mass flow through aperture 18, the larger the opening angle of gate 30 will be, while for smaller desired mass flows gate 30 will be open at smaller angles. The opening angle of gate 30 is also based on the size of valve 10. Valve 10 can be any size suitable for a specific application. For example, in applications where large fluid mass flows are desired, valve 10 will be larger than in applications where lesser fluid mass flows are desired.

A controller (not shown) coupled to an actuator 36 moves gate 30 within frame 14. Valve 10 controls the flow of fluid between environments E1 and E2 such that the direction of fluid flow can be in either direction. That is, the fluid can flow from E1 through valve 10 to E2, or the fluid can flow from E2 through valve 10 to E1.

Gate 30 includes a leading edge 38, a trailing edge 42, a front side 46, a back side 50, a top edge 54 and a bottom edge 58. Additionally, gate 30 includes a general surface generally indicated in FIGS. 1 and 2 by the reference character 'S'. Surface S cumulatively includes the surfaces of leading edge 38, trailing edge 42, front side 46, back side 50, top edge 54 and bottom edge 58. Gate 30 has a substantially aerodynamically clean profile, such that surface S is smooth and substantially free from protrusions that would impede the flow of fluid over surface S of gate 30 and/or through valve 10. Therefore, fluid passing over gate 30 is allowed to generally adhere to surface S as the fluid flows over gate 30, thereby reducing the occurrence of coherent vortex shedding, which creates audible noise, sometimes referred to herein as tones. Put another way, aerodynamically clean surface S enables laminar flow to occur as the fluid flows over surface S when gate 30 is positioned at smaller opening angles, e.g. 0° to 6°. However, for larger opening angles of gate 30, e.g. 7° to 90°, coherent vortex shedding may still occur and induce annoying tones. To reduce noise induced by the coherent vortex shedding, preferably substantially eliminate the noise, noise treatment is applied in critical areas of gate 30. The noise treatment is described in detail below.

In one embodiment, leading edge 38 is rounded, thereby contributing to the aerodynamically clean profile of gate 30 and reducing tones created by coherent vortex shedding The rounded contour of leading edge 38 allows the fluid to pass around leading edge 38 with little or substantially no separation from surface S such that coherent vortex shedding does not occurs whereby audible tones would be created. The rounded shape of leading edge 30 enhances the attachment of the fluid to leading edge 30 for approximately all angle openings of gate 30 and for approximately all fluid flow rates. The rounded leading edge 38 is particularly effective in reducing noise generation at small angle openings, e.g. 0° to 60°.

In another embodiment, front side 46 has a slightly convex contour, thereby contributing to the aerodynamically clean profile of gate 30 and reducing the occurrence of coherent vortex shedding.

Another source of noise that can commonly occur with valves, such as valve 10, is tones generated when a fluid flowing across a surface collides with a bump or an edge where the height of the surface changes. For example, edge tones can be created by a flow of fluid isolated to environment E2 that flows along an outer surface 62 of frame 14, across aperture 18, along surface S, and collides with the edge of frame 14 on the opposite side of aperture 18. In one embodiment, to reduce the occurrence of such an edge tone, a trailing portion of front side 46, i.e. the portion of front side 46 that joins trailing edge 42, is adapted to have a substantially flush positional relationship with an outer surface 64 of frame 14. The trailing portion of front side 46 is adapted to have a substantially flush positional relationship with outer surface 64 for all angle openings of gate 30, particularly when gate 30 is positioned within a main operating range, e.g. between 10° and 20°. The flush positional relationship reduces a difference in surface heights between the trailing portion of front side 46 and frame outer surface 64, whereby edge tones would be produced as a flow of fluid flows across aperture 18, over gate 30 front side 46 and collides with frame 14.

Yet another source of noise that can commonly occur with valves, such as valve 10, is leak tones generated when a fluid flows through a gap between parts of a valve, such as valve 10. In one embodiment, to substantially reduce a risk of leak tones occurring by fluid flowing between divider 22 and frame 14, valve 10 includes a gasket 66 positioned between divider 22 and frame 14. Gasket 22 seals any openings the may exist between divider 22 and frame 14 due to variances in the contour of divider 22. Thus, by sealing any openings, gaskets 66 substantially reduces any leak noises from occurring. Preferably, gasket 22 is designed to match the contour of frame 14, thereby enabling consistent seating of valve 10 in divider 22. The consistent seating of valve 10 in divider 22 reduces the potential for edge tone to occur as a flow of fluid isolated to E2 flows across divider 22 outer surface 63.

In yet another embodiment, to further reduce noise produced by coherent vortex shedding of the fluid as the fluid passes over gate 30, at least one portion 70 of the gate 30 surface S includes a rough texture. More specifically, at least one section of surface S is adapted to include a rough texture portion, herein referred to as rough texture portion 70. The at least one section has a specific location on surface S determined to be a location where coherent vortex shedding occurs. Rough texture portion 70 effectively reduces, preferably substantially eliminates, noise generated by coherent vortex shedding for approximately all opening angles of gate 30 and fluid mass flow rates through aperture 18. For example, rough texture 70 will effectively reduce coherent vortex shedding at small opening angles of gate 30 and high mass flow rates where coherent vortex shedding is particularly prone to occur in valves such as valve 10

Rough texture portion 70 can be provided by coupling or bonding a material or substance having a rough texture to surface S, or by integrally forming the rough texture portion 70 with surface S either during or subsequent to the manufacturing of gate 30. For example, rough texture portion 70 can be anti-skid tape adhered to surface S, or a gritty substance sprayed on surface S. In addition to having a specific location, rough texture portion 70 has a specific size, shape, and roughness.

Rough texture portion 70 reduces tones generated by coherent vortex shedding by breaking up the vortex shedding such that when the fluid separates from surface S and begins to tumble, the tumbling fluid will not establish a constant tumbling frequency. By breaking up the vortex shedding, the rough texture portion 70 randomizes any coherent vortex shedding, thereby substantially reducing the generation of noise and tones. Thus, rough texture portion 70 effectively detunes the tones by preventing the vortex shedding from establishing a constant frequency.

To determine the location of rough texture portion 70 testing must be performed on valve 10. For example computational fluid dynamics (CFD) testing can be performed to determine at least one specific location on surface S where vortex shedding will occur. If such testing determines that vortex shedding will occur at more than one location on the gate surface S, then surface S will include a rough texture portion 70 at each location. Therefore, surface S can include a plurality of rough texture portions 70, whereby one rough texture portion 70 is located at each of the locations at which it has been determined vortex shedding will occur.

The size, shape, and roughness of rough texture portion 70 that most effectively reduces coherent vortex shedding at each specific location is also predetermined by testing, for example CFD testing. The size of rough texture portion 70 relates to the amount of surface area of surface S over which it has been determined that vortex shedding will occur. Likewise, the shape of rough texture portion 70 relates to the shape of surface area of surface S over which it has been determined that vortex shedding will occur.

In one preferred embodiment, the size(s) and shape(s) of the portion(s) of surface S over which testing has determined vortex shedding will occur, are only used as minimum measurements to define the shape and size of rough texture portion 70. For example, it may be determined that vortex shedding will occur over a 2 $cm^2$ (0.310 $in^2$) area of surface S on front side 46 having a generally oval shape. Although only an oval area of 2 $cm^2$ has been determined to cause vortex shedding, for convenience and/or efficiency, surface S may include a rough texture portion 70 having a 3 $cm^2$ (0.465 $in^2$) generally rectangular area that covers and extends past the oval 2 $cm^2$ area. As a further example, although testing may determine that vortex shedding will occur over a small portion of surface S on the leading edge of gate 30, surface S may include rough texture portion 70 that covers the entire leading edge 38 and a portion of both front and back sides 46 and 50.

In an alternative embodiment, the size(s) and shape(s) of the portion(s) of surface S over which testing has determined vortex shedding will occur, are used as substantially exact measurements that define the shape and size of rough texture portion 70. For example, if testing determines that vortex shedding will occur over a 2 $cm^2$ (0.310 $in^2$) area of surface S on front side 46 having a generally oval shape, front side 46 will include a rough texture portion 70 covering substantially 2 $cm^2$ (0.310 $in^2$) and having a generally oval shape. In another preferred embodiment, surface S includes rough texture portion 70 such that substantially all of surface S has a rough texture.

The quality of roughness of rough texture portion 70 is also predetermined from test results. That is, the rough texture portion 70 has a predetermined roughness such that the texture has a "graininess", "unevenness" and/or "coarseness" that will reduce coherent vortex shedding to a desirable level. Preferably, the predetermined roughness will substantially eliminate coherent vortex shedding. For example, laboratory wind tunnel testing or field testing of various qualities of roughness will determine the graininess of rough texture portion 70 to substantially reduce coherent vortex shedding for a given gate 30 of valve 10.

In an exemplary embodiment, valve 10 can be an outflow valve for controlling air pressure within a mobile platform passenger cabin. In this exemplary embodiment, valve 10 would be installed in an aperture in an outer shell of a fuselage or body of the mobile platform and would control the flow of air from inside the mobile platform to an ambient environment outside the mobile platform.

Figure 3:
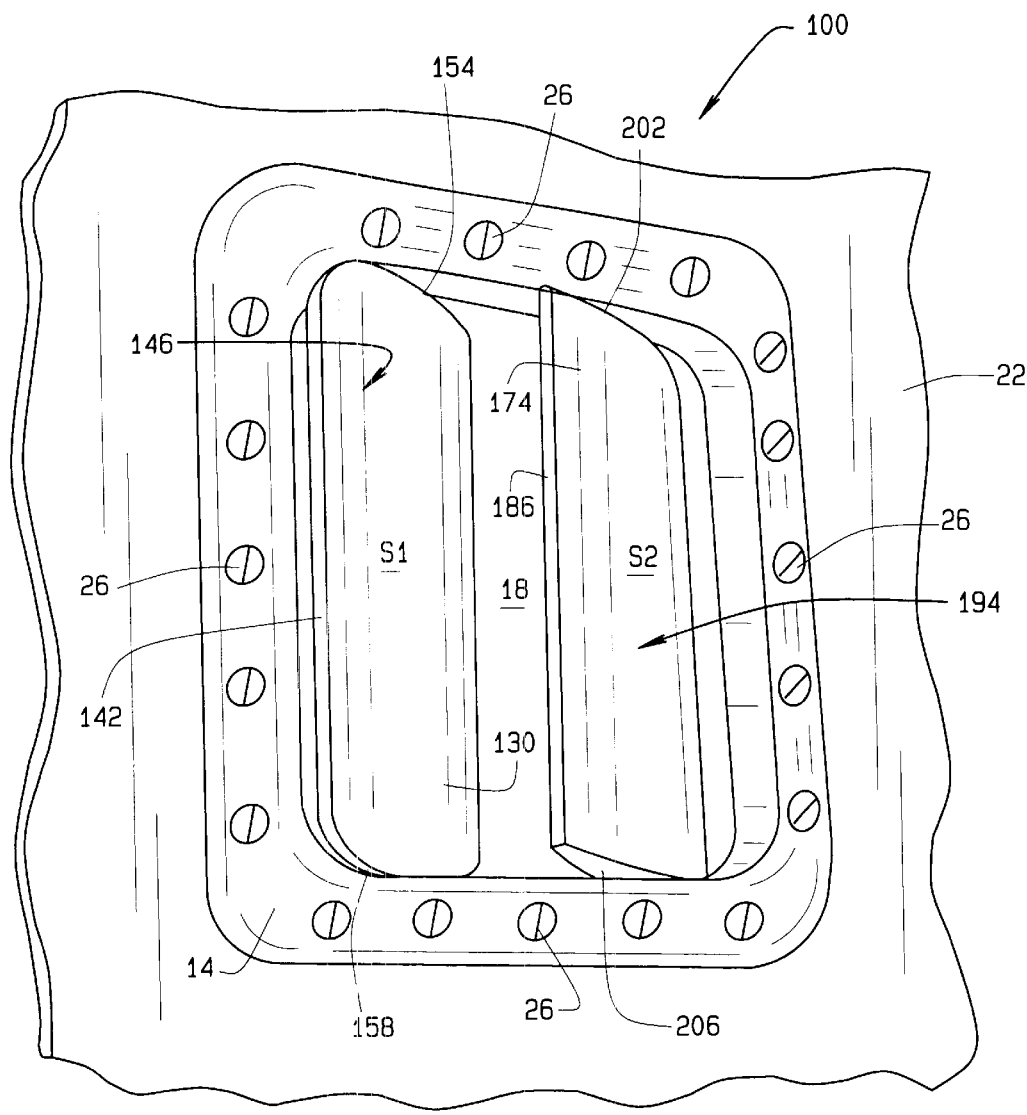
FIG. 3 is a schematic of a front view of a valve for controlling the flow of a fluid the between first and second environments shown in FIG. 2, in accordance with another preferred embodiment of the present invention.
Figure 4:
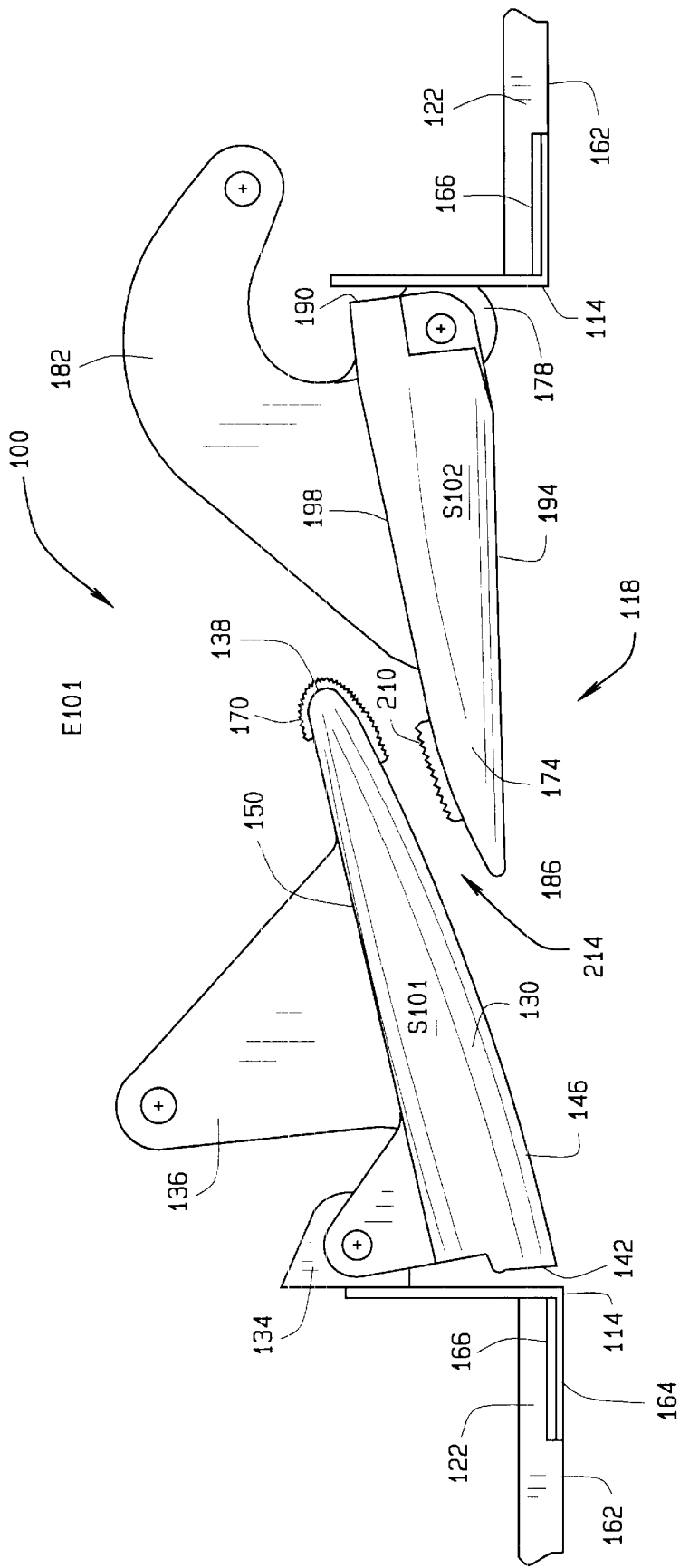
FIG. 4 is a schematic of a top view of the valve shown in FIG. 3.

FIGS. 3 and 4 are, respectively, schematics of a front view and a top view of a dual gate valve 100 for controlling the flow of a fluid, for example air, between a first environment E101 and a second environment E102, in accordance with another preferred embodiment of the present invention. Valve 100 includes a frame 114 adapted to fit within the perimeter of an aperture 118 in a divider 122. Frame 114 is coupled to divider 122 using fastening means 126. Valve 100 includes a first gate 130 that is substantially identical to gate 30 shown and described above in reference to FIGS. 1 and 2. For convenience and simplicity, the reference numerals used to describe first gate 130 are the reference numerals used to describe gate 30 incremented by 100. Thus, first gate 130 includes a hinge 134, an actuator 136, a leading edge 138, a trailing edge 142, a front side 146, a backside 150, a top edge 154, and a bottom edge 158. Additionally, gate 130 includes a general surface S101 that cumulatively includes the surfaces of leading edge 138, trailing edge 142, front side 146, backside 150, top edge 154 and bottom edge 158.

Furthermore, first gate 130 has a plurality of preferred embodiments wherein the description of the features and functions in each embodiment of gate 30 above is applicable to describe the features and functions of an embodiment of first gate 130. Further yet, FIG. 4 shows that in one preferred embodiment first gate 130 includes at least one rough texture portion 170 that is substantially identical in structure and function to the at least one rough texture portion 70 included in a preferred embodiment of gate 30. Still further, in a preferred embodiment, valve 100 includes a gasket 166 substantially identical in structure and function as gasket 66 described above in reference to FIGS. 1 and 2.

In addition to first gate 130, valve 100 includes a second gate 174 hingedly coupled to frame 114, via at least one hinge 178, such that gate 174 is movable between an open position and a closed position within frame 114. In the closed position, using hinge 178 as a zero point of reference, gate 174 will have approximately an one hundred and eighty degree (180°) opening angle with divider 122. In the open position, gate 174 can have an opening angle of any value, not inclusive of one hundred and eighty degrees (180°), between one hundred and eighty degrees (180°) and zero degrees (0°), based on a desirable fluid mass flow through aperture 118. The opening angle of gate 174 is also based on the size of valve 100. Valve 100 can be any size suitable for a specific application. For example, in applications where large fluid mass flows are desired, valve 100 will be larger than in applications where lesser fluid mass flows are desired.

A controller (not shown), coupled to a linkage (not shown) that links actuator 136 to an actuator 182 of second gate, moves first gate 130 and second gate 174 within frame 114. Valve 100 controls the flow of fluid between environments E101 and E102, such that the direction of fluid flow can be in either direction. That is, the fluid can flow from E101 through valve 100 to E102, or the fluid can flow from E102 through valve 100 to E101.

Second gate 174 includes a leading edge 186, a trailing edge 190, a front side 194, a backside 198, a top edge 202 and a bottom edge 206. Addition ally, gate 174 includes a general surface generally indicated in FIGS. 3 and 4 by the reference character 'S102'. Surface S102 cumulatively includes the surfaces of leading edge 186, trailing edge 190, front side 194, backside 198, top edge 202 and bottom edge 206. Gate 174 has a substantially aerodynamically clean profile, such that surface S102 is smooth and substantially free from protrusions that would impede the flow of fluid over surface S102 of gate 174 and/or through valve 100. Therefore, fluid passing over gate 174 is allowed to generally adhere to surface S102 as the fluid flows over gate 174, thereby reducing the occurrence of coherent vortex shedding, which creates audible tones.

In on e preferred embodiment, at least one portion 210 of the gate 174 surface S102 includes a rough texture. More specifically, at least one section of surface S102 is adapted to include a rough texture portion, herein referred to as rough texture portion 210. The at least one section has a specific location on surface S102 determined to be a location where coherent vortex shedding occurs. Rough texture portion 210 can be provided by coupling or bonding a material or substance having a rough texture to surface S102, or rough texture portion 210 can be provided by integrally forming rough texture portion 210 with surface S102 either during or subsequent to manufacture of gate 174. In addition to having a specific location, rough texture portion 210 has a specific size, shape, and roughness.

Rough texture portion 210 reduces tones generated by coherent vortex shedding by breaking up the vortex shedding, such that when the fluid separates from surface S and begins to tumble, the tumbling fluid will not establish a constant tumbling frequency. Thus, rough texture portion 210 effectively detunes the tones by preventing the vortex shedding from establishing a constant frequency.

To determine the location of rough texture portion 210 testing must be performed on valve 100. For example, CFD testing can be performed to determine at least one specific location on surface S102 where vortex shedding will occur. If such testing determines that vortex shedding will occur at more than one location on surface S102, then surface S102 will include a rough texture portion 210 at each location. Therefore, surface S102 can include a plurality of rough texture portions 210, one rough texture portion 210 located at each of the locations on surface S102 at which it has been determined vortex shedding will occur.

The size, shape, and roughness of rough texture portion 210 that most effectively reduces coherent vortex shedding at each specific location is also predetermined by testing, for example CFD testing. The size of rough texture portion 210 relates to the amount of surface area of surface S102 over which it has been determined that vortex shedding will occur. Likewise, the shape of rough texture portion 210 relates to the shape of surface area of surface S102 over which it has been determined that vortex shedding will occur.

In one preferred embodiment, the shape(s) and size(s) of the portion(s) of surface S102 over which it has been determined that vortex shedding will occur, are only used as minimum measurements to define the shape and size of rough texture portion 210. For example, it may be determined that vortex shedding will occur over a 2 cm$^2$ (0.310 in$^2$) area of surface S102 on front side 194 having a generally oval shape. Although only an oval area of 2 cm$^2$ has been determined to cause vortex shedding, for convenience and/or efficiency, surface S102 may include a rough texture portion 210 having a 3 cm$^2$ (0.465 in$^2$) generally rectangular area that covers and extends past the oval 2 cm$^2$ area. As a further example, although testing may determine that vortex shedding will occur over a small portion of surface S102 on the backside 198 of gate 174, surface S102 may include rough texture portion 210 that covers a large portion of backside 198, all of trailing edge 186, and a portion of front side 194.

In an alternative embodiment, the size(s) and shape(s) of the portion(s) of surface S102 over which testing has determined vortex shedding will occur, are used as substantially exact measurements that define the shape and size of rough texture portion 210. For example, if testing determines that vortex shedding will occur over a 2 cm$^2$ (0.310 in$^2$) area of surface S102 on front side 194 having a generally oval Shape, front side 194 will include a rough texture portion 210 covering substantially 2 cm$^2$ (0.310 in $^2$ and having a generally oval shape. In another preferred embodiment, surface S102 includes rough texture portion 210, such that substantially all of surface S102 has a rough texture.

The roughness of rough texture portion 210 is also predetermined from test results. The rough texture portion 210 has a predetermined roughness such that the texture has a "graininess", "unevenness", and/or "coarseness" that will reduce coherent vortex shedding to a desirable level, preferably will substantially eliminate coherent vortex shedding.

In another preferred embodiment, the gate controller and linkage operate to move first and second gates 130 and 174 within frame 114 such that a constant, or slightly convergent, nozzle throat section 214 is maintained during the most common operating opening angles of gate 100. More specifically, during the most common operating opening angles of gate 100, for example between 12° and 18°, first gate 130 front side 146 and second gate 174 backside 198 are maintained in an approximately parallel or slightly convergent relationship. Slightly convergent meaning that backside 186 is closer to front side 146 at the trailing edge 186 of second gate 174 than at the leading edge 138 of first gate 130. The constant nozzle throat section reduces occurrence of tones created as the fluid flows between the first environment E101 and the second environment E102.

Figure 5:
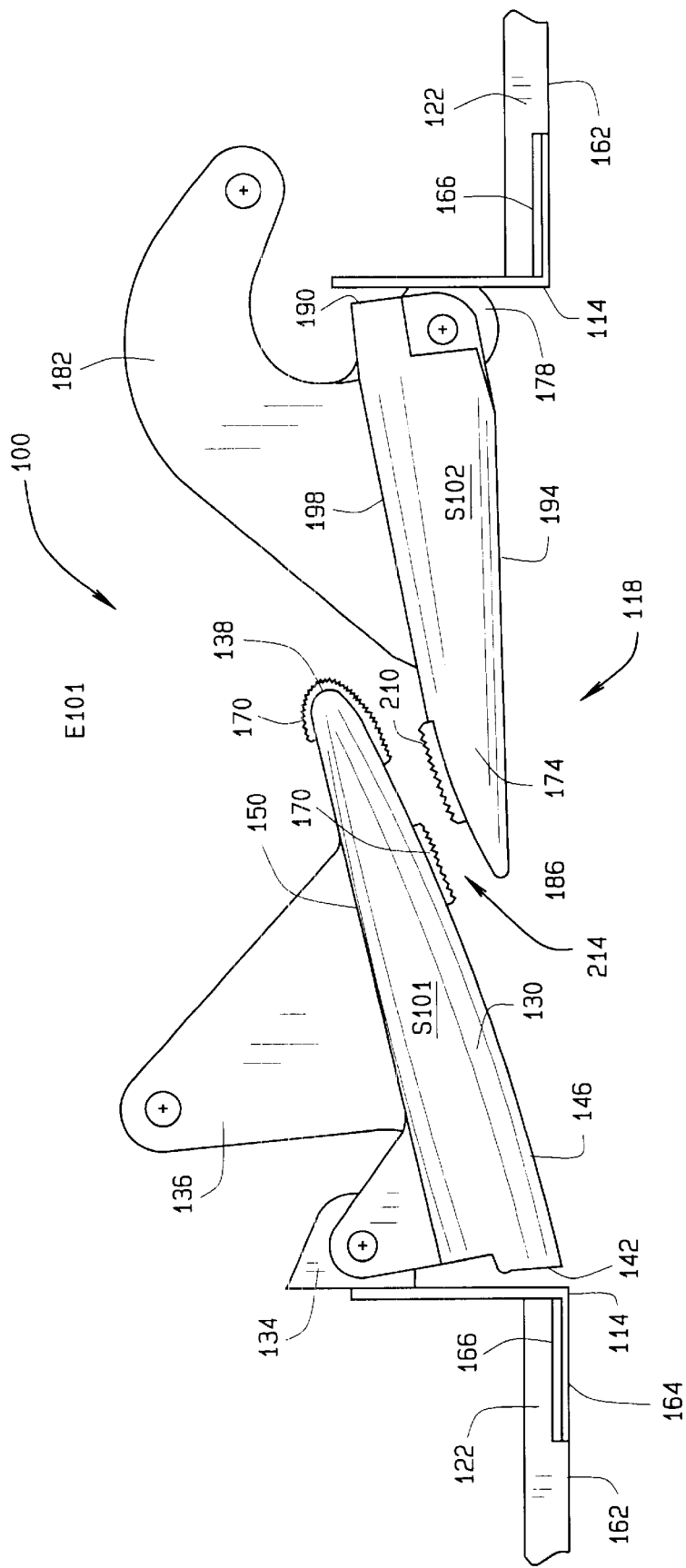
FIG. 5 is a schematic of an alternate embodiment of the valve shown in FIG. 4, wherein a first gate includes two rough texture portions and a second gate includes one texture portion.

FIG. 5 is a schematic of an alternate embodiment of valve 100 (shown in FIG. 4), wherein first gate 103 includes two rough texture portions 170 and second gate 174 includes one texture portion 210. In this embodiment first gate 130 includes two rough texture portions 170 strategically located on surface S301 and having a specific size, shape, and coarseness effective to substantially reduce coherent vortex shedding of fluid flowing over surface S301 of first gate 330. Additionally, second gate 374 includes one rough texture portion 410 strategically located on surface S302 and having a specific size, shape, and coarseness effective to substantially reduce coherent vortex shedding of fluid flowing over surface S302 of second gate 374.

Depending on the opening angles of gates 130 and 174 and the fluid mass flow rate through aperture 118, coherent vortex shedding can occur at leading edge 138 and front side 146 of first gate 130, and backside 198 of second gate 174. In order to substantially reduce coherent vortex shedding in gate 100, rough texture portions 170 are included on surfaces S101 and S102 at these three areas. Locating rough texture portions 170 at these three locations will substantially reduce the potential for noise generated by coherent vortex shedding in valve 100, regardless of the opening angles of first and second gates 130 and 174.

In an exemplary embodiment, valve 100 can be an outflow valve for controlling air pressure within a mobile platform passenger cabin. In this exemplary embodiment, first gate 114 would be an aft gate, second gate 174 would be a forward gate, and valve 100 would be installed in an aperture in an outer skin of a fuselage or body of the mobile platform and would control the flow of air from inside the mobile platform to an ambient environment outside the mobile platform. The features of the various preferred embodiments described above would substantially reduce noise, audible in the passenger cabin, from being generated by air flowing out of the outflow valve and by air flowing across the outflow valve external to the aircraft.

While the invention has been described in terms of various specific embodiments, those skilled in the art will recognize that the invention can be practiced with modification within the spirit and scope of the claims.

What is claimed is:

1. A valve for controlling a flow of a fluid between a first environment to a second environment, said valve comprising:
   a frame adapted to fit within a perimeter of an aperture in a divider separating the first environment from the second environment; and
   at least one gate movable within the frame to control a flow of the fluid between the first environment and the second environment through the aperture, the gate comprising a surface, wherein at least one portion of the surface includes a rough texture for reducing coherent vortex shedding of the fluid.

2. The valve of claim 1, wherein the portion of the gate surface having the rough texture has a predetermined location on the gate surface effective to substantially reduce coherent vortex shedding.

3. The valve of claim 1, wherein the portion of the gate surface having the rough texture has a perimeter having a predetermined shape effective to substantially reduce coherent vortex shedding.

4. The valve of claim 1, wherein the portion of the gate surface having the rough texture has a predetermined size effective to substantially reduce coherent vortex shedding.

5. The valve of claim 1, wherein the rough texture has a predetermined roughness effective to substantially reduce coherent vortex shedding.

6. The valve of claim 1, wherein the gate controls the flow of air between the first environment and the second environment.

7. The valve of claim 1, wherein substantially the entire gate surface includes the rough texture.

8. The valve of claim 1, wherein the rough texture comprises anti-skid tape attached to the gate surface.

9. The valve of claim 1, wherein the valve comprises a first gate and a second gate.

10. The valve of claim 9, wherein the valve further comprises a gasket adapted to be positioned between the frame and the divider, thereby substantially eliminating leak tones as the fluid flows between the first environment and the second environment.

11. The valve of claim 9, wherein at least one portion of the surface of the first gate has a rough texture for reducing coherent vortex shedding of the fluid, wherein the portion of the first gate having the rough texture comprises at least one of the following:
   a predetermined location on the first gate surface effective to substantially reduce coherent vortex shedding;
   a perimeter having a predetermined shape effective to substantially reduce coherent vortex shedding;
   predetermined dimensions that define the size of the area of the first gate surface that includes the rough texture, the size being effective to substantially reduce coherent vortex shedding; and
   a predetermined roughness effective to substantially reduce coherent vortex shedding.

12. The valve of claim 11, wherein at least one portion of the surface of the second gate has a rough texture for reducing coherent vortex shedding of the fluid, wherein the portion of the second gate having the rough texture comprises at least one of the following:
   a predetermined location on the second gate surface effective to substantially reduce coherent vortex shedding;
   a perimeter having a predetermined shape effective to substantially reduce coherent vortex shedding;
   predetermined dimensions that define the size of the area of the first gate surface that includes the rough texture, the size being effective to substantially reduce coherent vortex shedding; and
   a predetermined roughness effective to substantially reduce coherent vortex shedding.

13. The valve of claim 9, wherein two portions of the surface of the first gate have a rough texture for reducing coherent vortex shedding of the fluid, wherein each of the two portions of the first gate having the rough texture comprise at least one of the following:
   a predetermined location on the first gate surface effective to substantially reduce coherent vortex shedding;
   a perimeter having a predetermined shape effective to substantially reduce coherent vortex shedding;
   predetermined dimensions that define the size of the area of the first gate surface that includes the rough texture, the size being effective to substantially reduce coherent vortex shedding; and
   a predetermined roughness effective to substantially reduce coherent vortex shedding.

14. The valve of claim 13, wherein one portion of the surface of the second gate has a rough texture for reducing coherent vortex shedding of the fluid, wherein the portion of the second gate having the rough texture comprises at least one of the following:
   a predetermined location on the second gate surface effective to substantially reduce coherent vortex shedding;
   a perimeter having a predetermined shape effective to substantially reduce coherent vortex shedding;
   predetermined dimensions that define the size of the area of the first gate surface that includes the rough texture, the size being effective to substantially reduce coherent vortex shedding; and
   a predetermined roughness effective to substantially reduce coherent vortex shedding.

15. A method for controlling the flow of a fluid from a first environment to a second environment, the method comprising:
   providing a valve to be installed in a divider separating the first environment and the second environment, the valve having at least one gate for controlling the flow of fluid from the first environment to the second environment, the gate having a surface, wherein at least one portion of the gate surface includes a rough texture for reducing coherent vortex shedding of the fluid.

16. The method of claim 15, wherein providing the valve comprises:
   predetermining a location on the gate surface at which including the rough texture will most effectively reduce coherent vortex shedding of the fluid; and
   providing the gate surface to include the rough texture at a the predetermined location.

17. The method of claim 15, wherein providing the valve comprises:
   predetermining a shape of a perimeter of the portion of rough texture that will most effectively reduce coherent vortex shedding of the fluid; and
   providing the gate surface to include the portion of rough texture with the perimeter having the predetermined shape.

18. The method of claim 15, wherein providing the valve comprises:
  predetermining an amount of area of the gate surface for which the rough texture is included that will most effectively reduce coherent vortex shedding of the fluid; and
  providing the gate surface such that the gate surface includes the predetermined amount of area of rough texture.

19. The method of claim 15, wherein providing the valve comprises:
  predetermining a roughness of the rough texture that will most effectively reduce coherent vortex shedding of the fluid; and
  providing the gate surface such that the portion including the rough texture has the predetermined roughness.

20. The method of claim 15, wherein providing the valve comprises installing the valve in the divider, wherein substantially the entire gate surface includes the rough texture.

21. The method of claim 15, wherein providing the valve comprises attaching anti-skid tape the portion of the gate surface such that the portion of the gate includes a rough texture.

22. The method of claim 15, wherein providing the valve comprises installing the valve in the divider, wherein the valve includes a first gate and a second gate, each gate having a surface including at least one portion having a rough texture for reducing coherent vortex shedding of the fluid.

23. The method of claim 22, wherein providing the valve comprises installing the valve wherein the portion of the first gate having the rough texture has at least one of the following:
  a predetermined location on the first gate surface effective to substantially reduce coherent vortex shedding;
  a perimeter having a predetermined shape effective to substantially reduce coherent vortex shedding;
  predetermined dimensions that define the size of the area of the first gate surface that includes the rough texture, the size being effective to substantially reduce coherent vortex shedding; and
  a predetermined roughness effective to substantially reduce coherent vortex shedding.

24. The method of claim 22, wherein providing the valve comprises installing the valve wherein the portion of the second gate having the rough texture has at least one of the following:
  a predetermined location on the second gate surface effective to substantially reduce coherent vortex shedding;
  a perimeter having a predetermined shape effective to substantially reduce coherent vortex shedding;
  predetermined dimensions that define the size of the area of the first gate surface that includes the rough texture, the size being effective to substantially reduce coherent vortex shedding; and
  a predetermined roughness effective to substantially reduce coherent vortex shedding.

25. A mobile platform comprising:
  a body comprising an outer shell having an aperture therethrough, and
  a valve adapted to fit within the aperture for controlling the flow of air between an environment inside the mobile platform and an environment outside of the mobile platform, wherein the valve comprises:
    at least one gate having a surface, wherein at least one portion of the surface includes a rough texture for reducing coherent vortex shedding of the air as the air passes through the valve.

26. The mobile platform of claim 25, wherein the portion of the gate surface having the rough texture comprises at least one of the following:
  a predetermined location on the gate surface effective to substantially reduce coherent vortex shedding;
  a perimeter having a predetermined shape effective to substantially reduce coherent vortex shedding;
  predetermined dimensions that define the size of the area of the first gate surface that includes the rough texture, the size being effective to substantially reduce coherent vortex shedding; and
  a predetermined roughness effective to substantially reduce coherent vortex shedding.

* * * * *